United States Patent [19]

Furney

[11] 4,167,687

[45] Sep. 11, 1979

[54] SMOKE DETECTOR APPARATUS AND IONIZATION CHAMBER THEREFOR

[75] Inventor: Douglas E. Furney, Golden, Colo.

[73] Assignee: Unitec, Inc., Englewood, Colo.

[21] Appl. No.: 767,582

[22] Filed: Feb. 10, 1977

[51] Int. Cl.[2] .............................................. G01N 23/12

[52] U.S. Cl. ...................................... 313/54; 250/381; 340/629

[58] Field of Search ........................ 340/237.5; 313/54; 250/381

[56] References Cited

U.S. PATENT DOCUMENTS

| | | | |
|---|---|---|---|
| 3,935,492 | 1/1976 | Sasaki et al. | 313/54 |
| 4,021,671 | 5/1977 | Solomon | 250/381 |

*Primary Examiner*—Rudolph V. Rolinec
*Assistant Examiner*—Darwin R. Hostetter
*Attorney, Agent, or Firm*—O'Rourke & Harris

[57] ABSTRACT

A smoke detection apparatus is disclosed having a highly efficient ionization chamber. The ionization chamber is primarily formed by a wire mesh collector that readily admits products of combustion such as smoke into the chamber which has therein an alpha emitting, radioactive source and a selectable portion of a tuning screw. Two types of smoke detectors are shown utilizing the ionization chamber with one of the detectors operating from a conventional A.C. power source and the other being battery operated. The smoke detector utilizing the conventional A.C. power source requires no transformer and has the alarm indicating horn connected with the A.C. source with the horn being triggered by a silicon controlled rectifier connected with the radioactive source in the ionization chamber through a field effect transistor switch. A rectified and regulated D.C. voltage is provided to the wire mesh collector and to the field effect transistor switch. The battery operated smoke detector has the alarm indicating horn connected with batteries through a transistor horn drive circuit that is triggered by a field effect transistor switch connected to the radioactive source within the ionization chamber. A circuit is provided to indicate low battery voltage and a regulated D.C. voltage is supplied to the wire mesh collector of the ionization chamber, to the field effect transistor switch, and to the low voltage indicating circuit.

11 Claims, 4 Drawing Figures

SMOKE DETECTOR APPARATUS AND IONIZATION CHAMBER THEREFOR

FIELD OF THE INVENTION

This invention relates to a combustion detection apparatus and, more particularly, relates to a smoke detector of the type having an ionization chamber.

BACKGROUND OF THE INVENTION

As is well known, various types of devices have been heretofore suggested and/or developed for monitoring or warning of selected conditions. From the standpoint of danger or potential harm, an important condition to be monitored is that of combustion, particularly in buildings or other structures where early detection of the presence of fire is essential to protect both life and property.

Combustion detection devices have been heretofore suggested and/or utilized and such devices using ionization chambers for detection purposes have heretofore been battery operated as well as operating from a conventional A.C. source. Examples of battery operated smoke detectors can be found, for example, in U.S. Pat. Nos. 3,717,862, 3,778,800 and 4,004,288, while example of smoke detectors utilizing a conventional commercial power source can be found in U.S. Pat. Nos. 3,842,409 and 3,866,195.

Improvements in detectors having ionization chambers for smoke detection can be realized, however, by providing a more efficient chamber which could result, for example, in a lower requirement for the amount of the radioactive source that might be utilized, and/or more simplified but yet dependable electronic circuitry to be utilized in conjunction with the chamber.

SUMMARY OF THE INVENTION

This invention provides an improved combustion detection apparatus that includes a highly efficient ionization chamber. The ionization chamber is primarily formed by a wire mesh that readily admits products of combustion such as smoke within the chamber which has a radioactive source therein emitting alpha particles, and tuning is achieved by a tuning screw having a selectable portion within the chamber adjacent to the radioactive source. Simplified electronic circuitry connected with the ionization chamber provides dependable alarm indications operable either by battery or with line voltages.

It is therefore an object of this invention to provide an improved combustion detection apparatus.

It is another object of this invention to provide an improved combustion detection apparatus having a highly efficient ionization chamber.

It is still another object of this invention to provide an improved combustion detection apparatus having an ionization chamber that is primarily formed by a wire mesh with the chamber having therein a radioactive source and a predetermined portion of a tuning screw.

It is still another object of this invention to provide an improved combustion detection apparatus having simplified yet dependable alarm circuitry connected with the ionization chamber.

It is yet another object of this invention to provide an improved combustion detection apparatus that is battery operated.

It is still another object of this invention to provide an improved combustion detection apparatus that operates from a conventional A.C. power source.

It is yet another object of this invention to provide an improved ionization chamber for a combustion detection apparatus.

It is still another object of this invention to provide an improved ionization chamber for a combustion detection apparatus that is primarily formed by a wire mesh with the chamber having therein a radioactive source and a preselected portion of a tuning screw.

With these and other objects in view, which will become apparent to one skilled in the art as the description proceeds, this invention resides in the novel construction, combination, and arrangement of parts substantially as hereinafter described, and more particularly defined by the appended claims, it being understood that such changes in the precise embodiment of the herein disclosed invention are meant to be included as come within the scope of the claims.

BRIEF DESCRIPTION OF THE DRAWINGS

The accompanying drawings illustrate complete embodiments of the invention according to the best mode so far devised for the practical application of the principles thereof, and in which.

DESCRIPTION OF THE INVENTION

Figure 1:
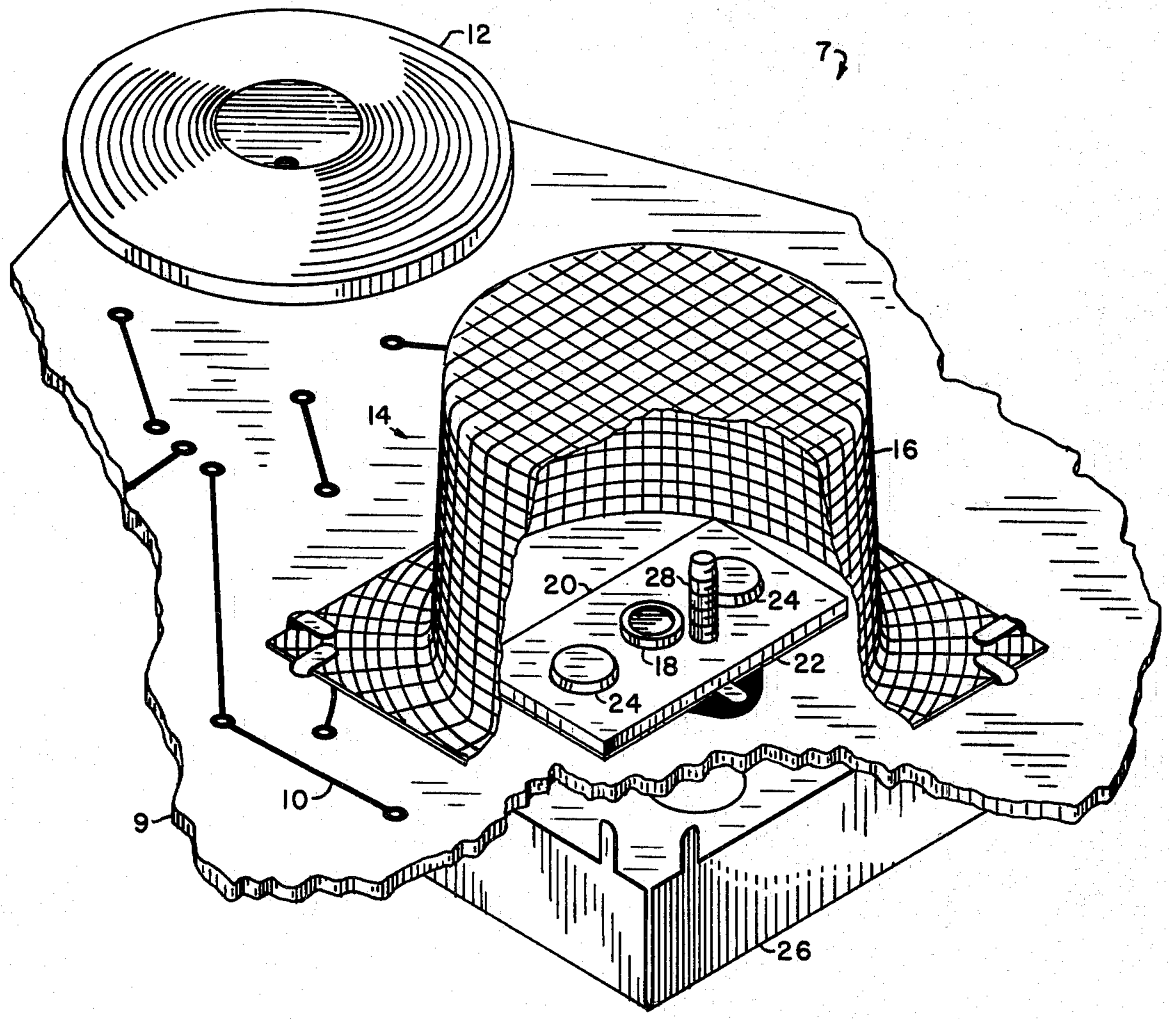
FIG. 1 is a perspective view of the combustion detection apparatus of this invention.

Referring now to the drawings, the smoke detector unit, or apparatus, 7 of this invention is shown in FIG. 1. As shown, a printed circuit board 9 is preferably utilized with the board having conventional printed wiring 10 thereon. Alarm indicating horn 12 is fastened to the board 9 and the ionization chamber 14 is centrally formed on board 9.

Ionization chamber 14 is primarily formed by a wire mesh collector 16 in the form of a dome or bowl with the edges of the collector being conventionally fastened to board 9 so that the chamber walls are thus formed by the wire mesh and by the board itself. The wire mesh provides an apertured collector plate with the mesh openings having a size so as to readily admit products of combustion such as smoke into the chamber. In a working embodiment of this invention, it has been found that 20—20 mesh wire cloth having 0.013 diameter wire can be advantageously utilized as the wire mesh collector with the formed collector having a diameter of about two inches and a height of about 1.25 inches. It is felt that the best average distance between the mesh collector and the radioactive source is between about one and one and a half inches.

Figure 2:
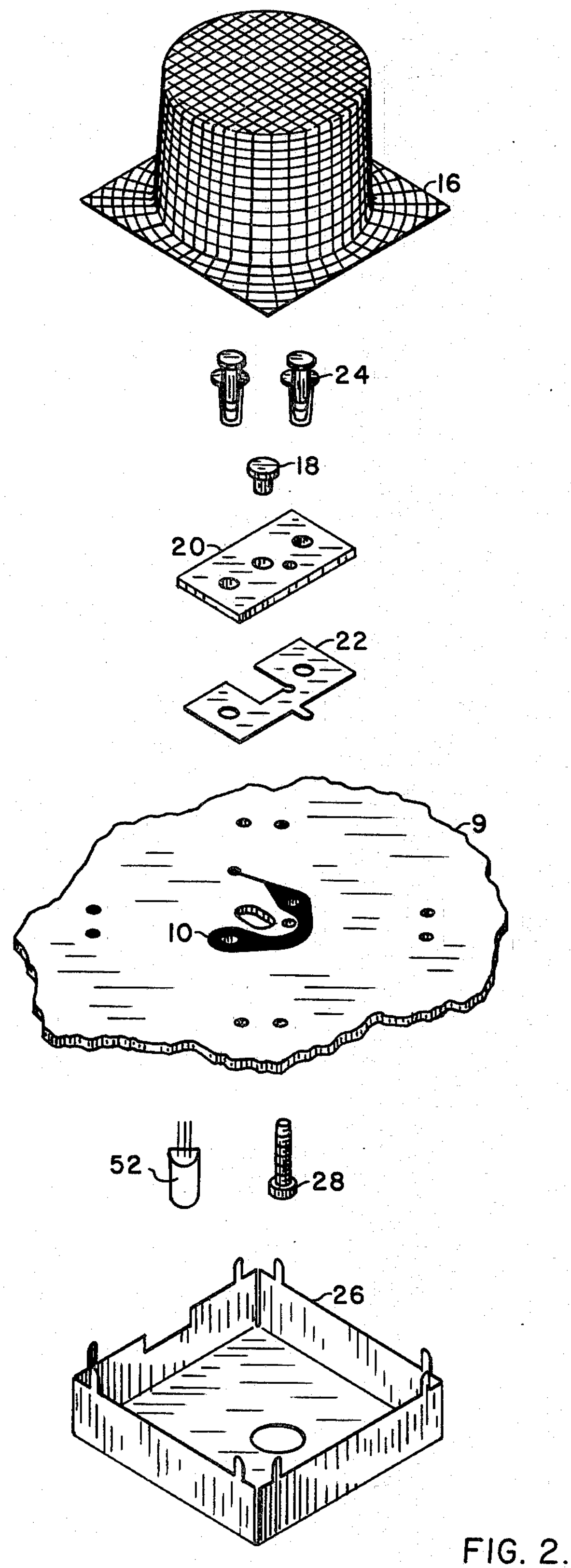
FIG. 2 is an exploded perspective view of the ionization chamber as shown in FIG. 1.

A radioactive source 18 that emits alpha particles is mounted within ionization chamber 14. Source 18 is preferably Americium 241 but other radioactive sources can also be utilized. As shown in FIGS. 1 and 2, radioactive source 18 is mounted on sourceholder 20 within the chamber above printed circuit board 9. A screw retainer/ground plate 22 is also provided between circuit board 9 and sourceholder 20. Sourceholder 20 is of insulated material, such as Teflon, and may have dimensions of about 1.25 inches×0.7 inches×1/16 inch, for example, while the screw retainer/ground plate 22 is electrically conductive and may be, for example, tin coated steel having dimensions of about 1.25 inches×0.62 inches×0.015 inches. Both the sourceholder 20 and screw retainer/ground plate 22 have apertures therein for fastening of the parts to the top of the printed circuit board 9 by mounting fasteners 24.

Figure 3:
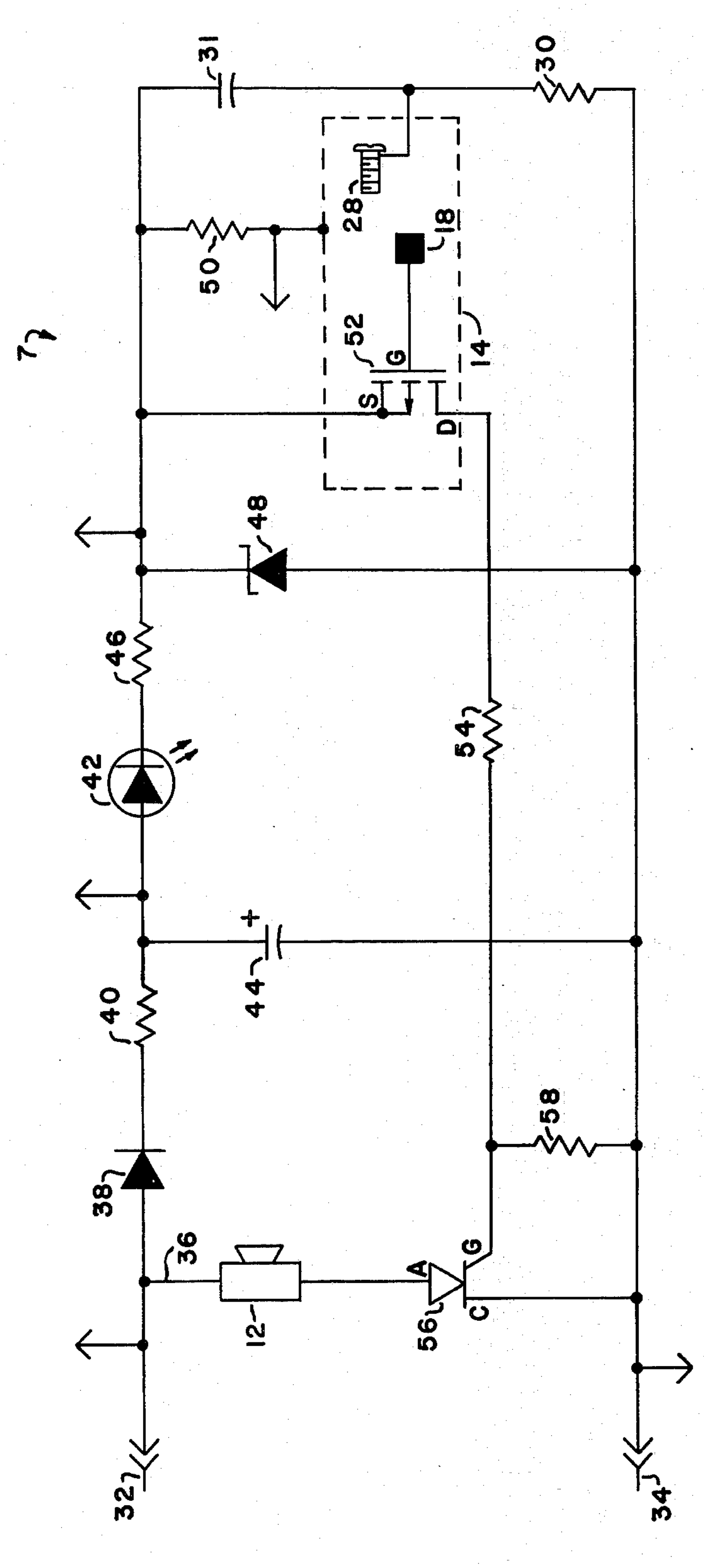
FIG. 3 is an electrical schematic of the combustion detection apparatus using a conventional A.C. power supply.

A shield 26 is also provided below the printed circuit board 9 (directly below the ionization chamber). Shield 26 may be tin coated steel material and have dimensions of about 2 inches×two inches×0.52 inches and may include mounting tabs for mounting of the shield to the underside of the printed circuit board. A tuning screw 28 extends upwardly through board 9, through an off-center aperture (of a diameter of about 0.094 inches for example) in screw retainer/ground plate 22 where an electrical contact is established between the screw and plate 22 (plate 22 also has a notch extending to the aperture receiving screw 28 and may have an extending tab for electrical connection purposes), and to an aperture in sourceholder 20 so that a selectable portion of the end of the screw extends into ionization chamber 14 adjacent to radioactive source 18. As shown in FIG. 3, tuning screw 28 is connected with ground through resistor 30 and is connected with the positive D.C. voltage through capacitor 31.

The electrical schematic of the smoke detector 7 of this invention for use with a conventional 110 volt A.C. power supply is shown in FIG. 3. The 110 volt power is coupled to the circuit through leads 32 and 34 with lead 34 being shown connected to ground.

Lead 32 is connected to one side of 110 volt horn 12 through lead 36 (no transformer is required) and is also connected to diode 38 that is a part of a one-half wave rectifier and filter arrangement that includes resistor 40 and capacitor 44. The junction of resistor 40 and capacitor 44 is connected to one side of pilot lamp 42 which has its other side connected through resistor 46 to Zener diode 48 so that a regulated 12 volt D.C. is supplied through resistor 50 to the wire mesh collector 16 of the ionization chamber 14 and to the source electrode of field effect transistor 52 (which is preferably an MOS FET that operates as a switch).

The gate electrode of FET 52 is connected to the radioactive source 18 and with the 12 volts supplied to the source electrode, the FET will conduct when the gate electrode has about 9 volts thereon.

The ionization chamber 14 of this invention is highly efficient (and is thought to approach 100% efficiency as established by the ratio of the current developed through the chamber to the amount of alpha particles emitted from the source) to thus require less radioactive source material for operation of the apparatus and/or to create a larger signal therethrough.

The drain electrode of FET 52 is coupled through resistor 54 to the gate electrode of silicon control rectifier (SCR) 56, which also has a resistor 58 to ground connected therewith. SCR 56 is connected between the horn 12 and ground and operates as a one-half wave rectifier and line switch.

Figure 4:
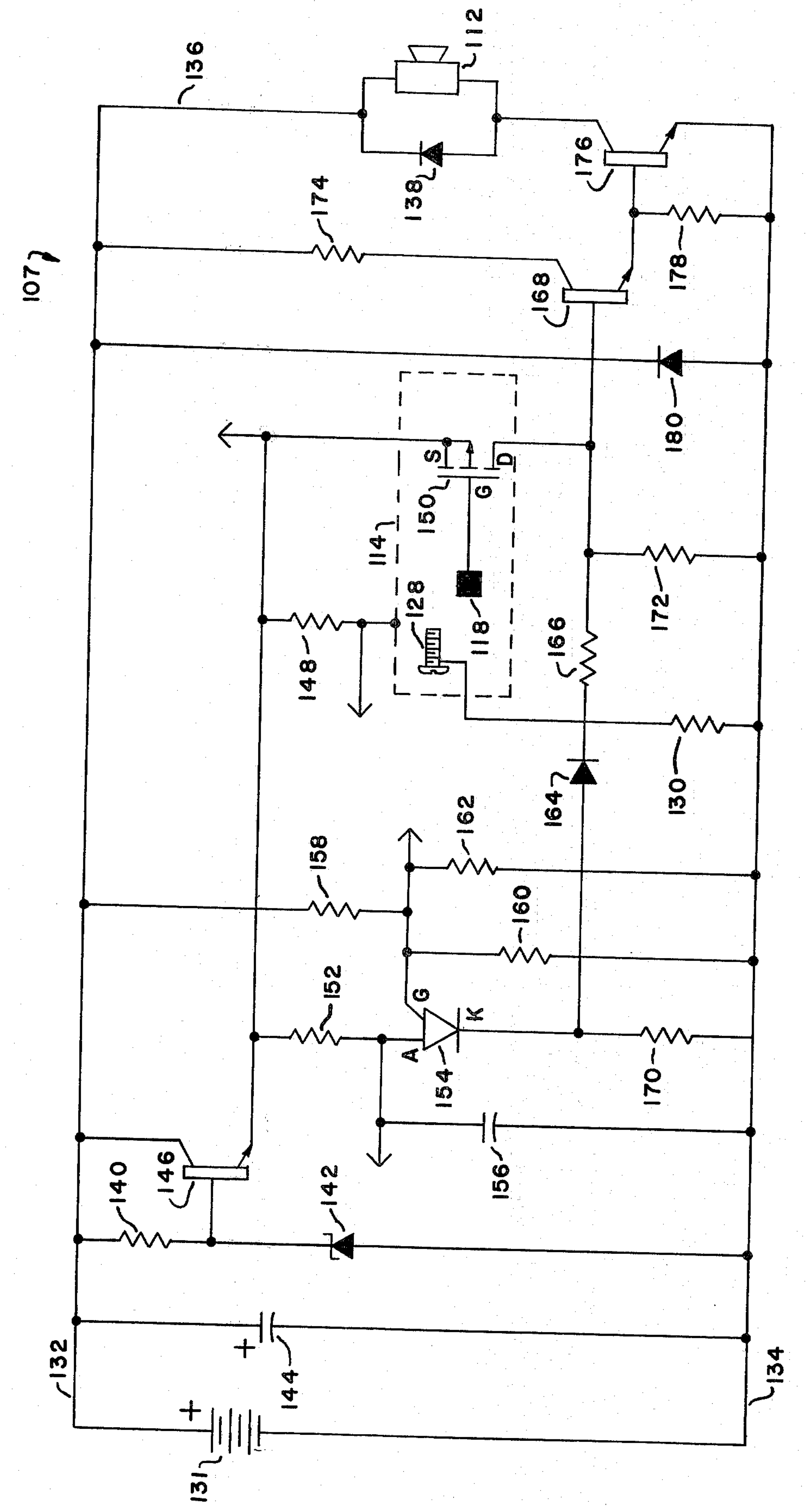
FIG. 4 is an electrical schematic of a battery operated combustion detection apparatus.

FIG. 4 is an electrical schematic diagram of a second embodiment 107 of the detector apparatus which is battery operated. As shown, a 9 volt D.C. horn 112 is provided as is an ionization chamber 114 having radioactive source 118 therein and is provided with tuning screw 128, connected to resistor 130. Ionization chamber 114, source 118 and tuning screw 128 are identical to and operate in the same manner as described hereinabove with respect to embodiment 7 of the invention.

In the embodiment of FIG. 4, one side of horn 12 is connected to the positive terminal of 9 volt D.C. battery 131 through leads 132 and 136 while the negative side of the battery is connected with lead 134. As also shown, horn 112 has a diode 138 connected in parallel therewith.

A voltage regulator is provided by series connected resistor 140 and Zener diode 142 connected across the battery terminals and having a capacitor 144 in parallel therewith with the junction of resistor 140 and Zener diode 142 being connected to the base of transistor 146. The emitter of transistor 146 (providing about 6.2 volts D.C.) is connected to the wire mesh collector of ionization chamber 114 through resistor 148, to the source electrode of field effect transistor 150 (which FET is within the shield 26 below the ionization chamber as is FET 52 discussed hereinabove with respect to the embodiment of the invention as shown in FIG. 3), and through resistor 152 to programable unijunction transistor (PUT) 154 of the battery low voltage sensing circuit.

PUT 154 has a capacitor 156 connected to one electrode (designated A) and has the gate electrode (designated G) connected to the junction of resistor 158 leading to the positive side of the voltage supply and parallel connected resistors 160 and 162 leading to the negative side of the voltage supply so that resistors 158, 160 and 162 form a voltage divider. The remaining electrode of PUT 154 (designated K) is connected through diode 164 and resistor 166 to the base of transistor 168, and to the negative side of the power supply through resistor 170.

Transistor 168 has the base connected to the negative side of the power supply through resistor 172 and the cathode connected to the positive side of the power supply through resistor 174. The emitter of transistor 168 is directly connected to the base of transistor 176 and through resistor 178 to the negative side of the power supply. Transistors 168 and 176 form a horn drive circuit with transistor 176 being connected between the horn and the negative side of the power supply. A diode 180 is also connected in parallel with the horn and transistor 176 across the power supply leads.

In the working embodiments of the invention, the following components have been utilized:

Resistors (ohms): 30—1 to 10M; 40—15K; 46—3.3K; 50—47K; 54—3.3K; 58—47K; 130—1 to 10M; 140—470K; 148—100K; 152—2.7M; 158—470K; 160—3.3M; 162—1.5M to 10M; 166—10K; 170—10K; 172—100K; 174—150; and 178—100K Capacitors (MFD): 31—0.01; 44—47; 144—220 to 500; and 156—1

Diodes: 38, 138, 164 and 180—IN4004

Zener Diodes: 759A(12 volt) and 142—6.8 volt

MOS FET: 52 and 150—823

SCR: 56—5064

Transistors: 146—930; 168—930; and 176—2222

PUT: 154—6028.

It is to be realized, however, that the components listed are by way of illustration only and the invention is not meant to be limited thereto.

For operation of the ionization chamber, it can be seen that the wire mesh collector is connected with a positive potential while the screw is negative. Since the ionization chamber of this invention is highly efficient, a much larger signal through the chamber may be realized than heretofore. By adjustment of the screw the sensitivity of the device is preselected since the screw is one of the primary electrodes with the wire mesh screen being the other primary electrode as shown in the drawings. If the screw is adjusted (i.e., by rotating the same) to allow more of the end of the screw to extend into the ionization chamber, this results in a greater amount of current passing through the chamber and will allow the horn to be energized at a lower amount of products of combustion in the chamber, while the opposite will occur if the screw is adjusted to cause less of the screw to extend into the chamber.

As products of combustion such as smoke enter the ionization chamber (which products can readily be admitted to the chamber where wire mesh is used as the collector) the potential at the gate electrode of the FET drops since the gate potential varies in proportion to the current flow between the primary electrodes and such current flow is reduced in the presence of smoke in the chamber. When this potential reaches a predetermined point, the FET will conduct and this energizes the horn to produce a continuous alarm output indication by triggering the SCR (FIG. 3 embodiment) or energizing the horn drive circuit (FIG. 4 embodiment).

In the battery operated detector (FIG. 4), the low voltage circuit will be energized when the voltage from the battery is sensed to be below a predetermined value (which may be, for example, about 7.5 volts for a 9 volt battery source). When the low voltage is sensed, PUT 154 is triggered to energize horn 112 through the horn drive circuit. The low voltage alarm, however, is not continuous but instead consists of repeated short sound bursts. In the embodiment as shown in FIG. 4, the bursts occur about every ten seconds with the period being determined by the time constant of resistor 152 and capacitor 156, while the duration of each burst is determined by the time constant of resistor 170 and capacitor 156.

In view of the foregoing, it can be appreciated that this invention provides an improved combustion product indicator having an improved ionization chamber that is highly efficient.

What is claimed is:

1. An ionization chamber for a combustion product indicating apparatus, said ionization chamber comprising:
   - a wire mesh collector at least partially forming the walls of said chamber and providing a first electrode;
   - electrically nonconductive mounting means forming the remainder of the walls of said chamber and having said wire mesh collector fastened thereto;
   - a second electrode having at least a portion within said chamber formed by said wire mesh collector and said mounting means with said second electrode being spaced from said wire mesh collector; and
   - a radioactive source mounted on said mounting means and spaced from said wire mesh collector with said source emitting alpha particles into said chamber.

2. The ionization chamber of claim 1 wherein said wire mesh collector is positioned between about one inch to one and one-half inches from said radioactive source.

3. The ionization chamber of claim 1 wherein said second electrode includes tuning means extending into said ionization chamber.

4. The ionization chamber of claim 3 wherein said tuning means includes a tuning screw mounted on said mounting means with said tuning screw being adjustable with respect to the amount of screw extending into said ionization chamber.

5. The ionization chamber of claim 4 wherein said mounting means includes first and second insulated boards having an electrically conductive plate therebetween in electrical contact with said tuning screw.

6. The ionization chamber of claim 4 wherein said chamber has a shield adjacent to said first board.

7. An ionization chamber for a combustion product indicating apparatus, said ionization chamber comprising:
   - an insulated mounting board;
   - a wire mesh collector positioned on said mounting board and providing a first electrode, said wire mesh collector and said board defining the walls of said ionization chamber;
   - an electrically conductive retainer plate within said chamber and adjacent to said mounting board;
   - a radioactive source within said chamber and spaced from said wire mesh collector for emitting alpha particles therein;
   - an insulated source mount within said chamber and adjacent to said retainer plate, said radioactive source being mounted thereon; and
   - a tuning screw extending through said retainer plate and said source mount so that a portion of said tuning screw providing a second electrode is within said chamber adjacent to said radioactive source.

8. The ionization chamber of claim 7 wherein said wire mesh collector is adapted to be connected to a positive potential, wherein said tuning screw is adapted to be connected to a negative potential, and wherein said radioactive source is adapted to be connected to a field effect transistor.

9. The ionization chamber of claim 8 wherein said insulated mounting board has a shield at the side opposite that of said wire mesh collector, and wherein said field effect transistor is within said shield.

10. An ionization chamber for a combustion product indicating apparatus, said ionization chamber comprising:
    - an apertured collector at least partially forming the walls of said chamber and providing a first electrode;
    - electrically nonconductive mounting means forming the remainder of the walls of said chamber and having said apertured collector fastened thereto;
    - a second electrode having at least a portion within said chamber formed by said apertured collector and said mounting means with said second electrode being spaced from said apertured collector; and
    - a radioactive source mounted on said mounting means and spaced from said apertured collector with said source emitting alpha particles into said chamber.

11. An ionization chamber for a combustion product indicating apparatus, said ionization chamber comprising:
    - an insulated mounting board;

an apertured collector positioned on said mounting board and providing a first electrode, said apertured collector and said board defining the walls of said ionization chamber;

an electrically conductive retainer plate within said chamber and adjacent to said mounting board;

a radioactive source within said chamber and spaced from said apertured collector for emitting alpha particles therein;

an insulated source mount within said chamber and adjacent to said retainer plate, said radioactive source being mounted thereon; and a tuning screw extending through said retainer plate and said source mount so that a portion of said tuning screw providing a second electrode is within said chamber adjacent to said radioactive source.

* * * * *